United States Patent

[11] 3,594,701

| [72] | Inventors | Terry Leroy Ramsey;<br>Reginald G. Ford, both of Tulsa, Okla. |
|---|---|---|
| [21] | Appl. No. | 735,052 |
| [22] | Filed | June 6, 1968 |
| [45] | Patented | July 20, 1971 |
| [73] | Assignee | Cities Service Oil Company<br>Tulsa, Okla. |

[54] SEAL FOR WELLBORE INSTRUMENT
9 Claims, 3 Drawing Figs.

[52] U.S. Cl. ................................................ 339/94 R,
174/47, 174/89, 339/104
[51] Int. Cl. ................................................ H01r 13/52
[50] Field of Search ................................ 339/94,
104, 117; 174/47, 70.1, 75, 89

[56] References Cited
UNITED STATES PATENTS

| 2,697,739 | 12/1954 | Presswell | 174/70.1 |
| 2,757,355 | 7/1956 | Howes et al. | 340/7 |
| 2,886,626 | 5/1959 | Burnett et al. | 174/18 |
| 3,058,086 | 10/1962 | Zwanzig | 339/94 |
| 3,384,860 | 5/1968 | Schaefer et al. | 339/94 |
| 3,413,407 | 11/1968 | Potter | 174/89 |

FOREIGN PATENTS

| 324,384 | 8/1919 | Germany | 339/104 |
| 112,951 | 2/1918 | Great Britain | 339/104 |
| 842,417 | 7/1960 | Great Britain | 339/94 |
| 847,858 | 9/1960 | Great Britain | 174/70.1 |

Primary Examiner—Ian A. Calvert
Assistant Examiner—Joseph H. McGlynn
Attorney—J. Richard Geaman ABSTRACT: The electrical connection between a downhole wellbore instrument and a single conductor is isolated from the wellbore environment by a sealing mechanism in which a pressure-deformable sealing ring is pressed into sealing contact with the conductor. The sealing ring is positioned in a packing gland affixed to a supporting block. A locking nut is removably secured to the packing gland. As the locking nut is secured to the packing gland, an annular ring positioned on the locking nut is moved inwardly in an opening in the packing gland, said packing ring establishing pressure contact with the sealing ring as the locking nut approaches its fully secured position. The pressure of the annular pressure ring upon the ring causes the sealing ring to deform so as to fill the seat in the packing gland in which it is positioned and to establish sealing contact with the conductor. The supporting block is affixed to a cable head connector to which the downhole instrument may be removably secured. The cable head connector has an axial opening in the upper portion thereof. The electrical connection and the packing gland are located in the space confined by the cable head connector and the supporting block attached thereto. An outer enclosing block, which is removably secured to the cable head connector, has an annular opening therein through which the conductor passes and in which the supporting block and the packing gland are positioned. Sealing means are provided between the outer enclosing block in both the cable head connector and the supporting block so as to prevent ingress of well fluids into the space confined by the cable head connector and the supporting block along the point of contact between these two members.

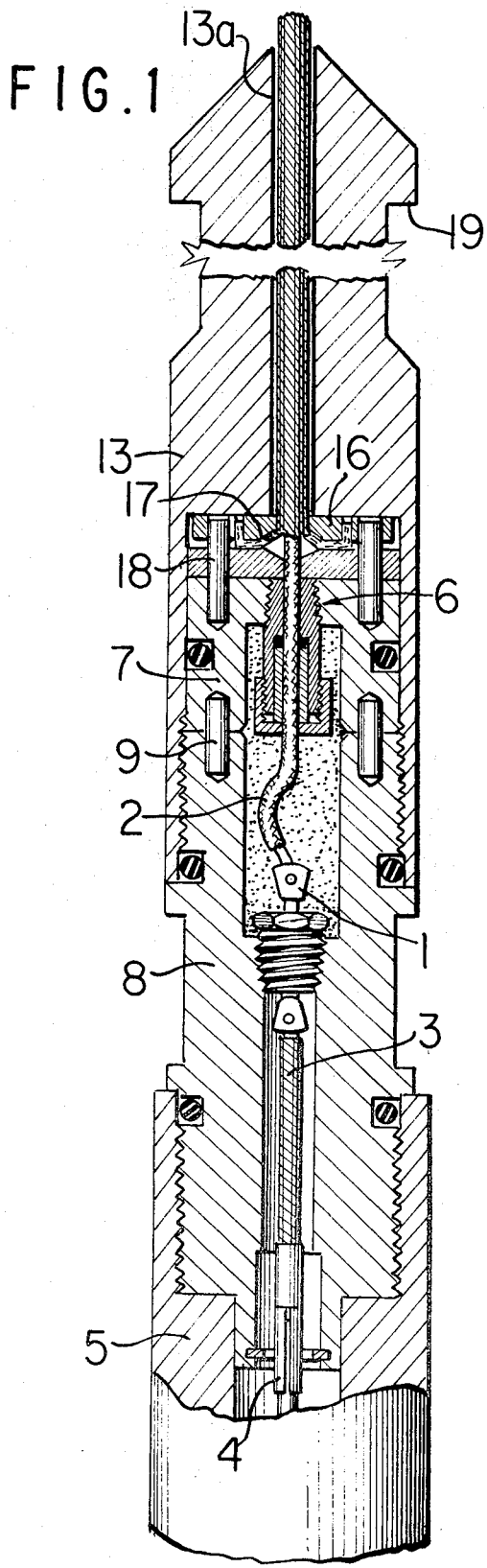
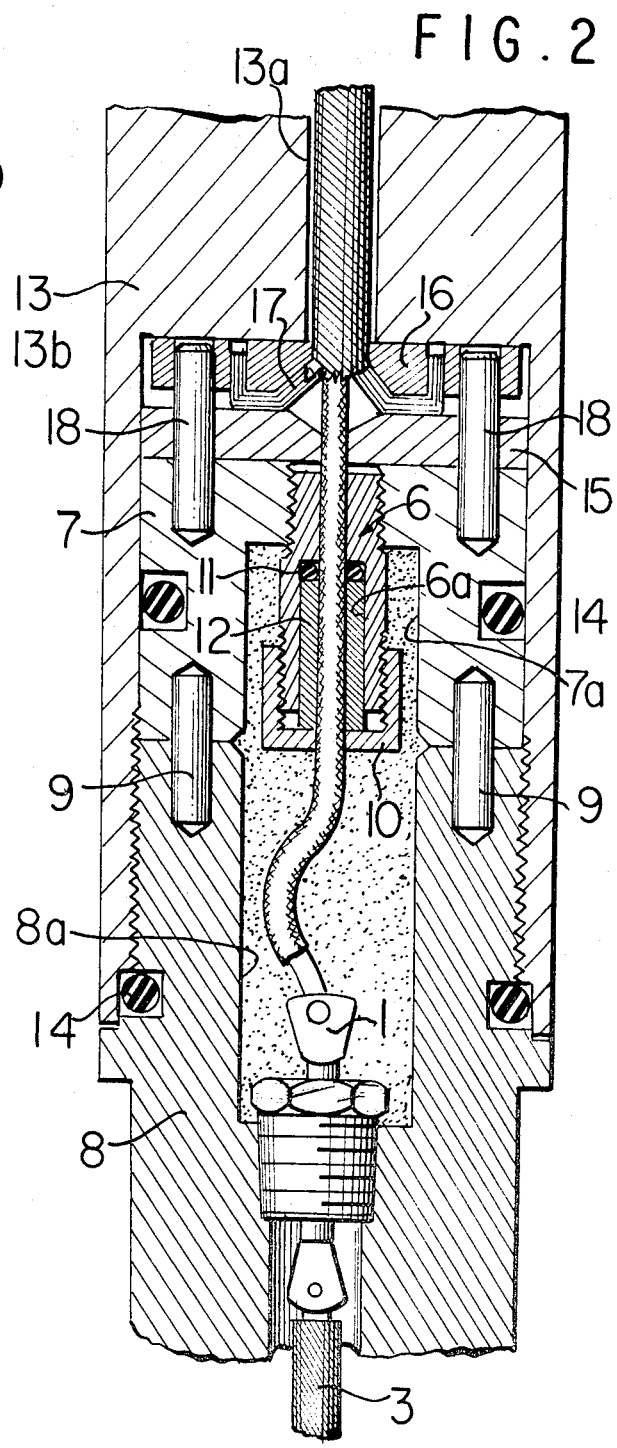

INVENTORS
TERRY L. RAMSEY
REGINALD G. FORD
ATTORNEY 3,594,701

SEAL FOR WELLBORE INSTRUMENT

BACKGROUND OF THE INVENTION

1. Field of the Invention

This invention relates to the isolating of an electrical connection between a downhole wellbore instrument and a single strand conductor extending to the surface. More particularly, it relates to an improved apparatus for sealing the electrical conductor in a manner capable of withstanding high temperature, high pressure wellbore environments.

Description of the Prior Art

A variety of well testing operations employ various devices, such as transducers, that send or modify electronic signals that are relayed to the surface by an armored electrical conductor. The providing of a reliable electrical connection between the downhole instrument and a single conductor woven wire line has proven troublesome because of the extreme conditions of temperature and pressure, together with highly corrosive fluids capable of dissolving many rubber and plastic materials, that are often encountered in well testing or treating operations. In previous well testing operations that did not require long duration tests nor wells in which high pressures and temperatures were encountered, the problem of providing a reliable electrical connection was not so severe as to require any actual solution to the problem indicated. As well technology has progressed, however, deeper wells are presently being employed. In addition, more advanced well testing techniques, coupled with the economic necessity for obtaining more and better information, has created a more urgent need in the art for effectively isolating the electrical connection for a downhole instrument from the corrosive fluids in the higher temperature, higher pressure wellbore environments to which downhole instruments are now exposed for more extended periods of time.

The electrical logging industry has been employing interlocking rubber sleeves to provide a seal at the higher pressures presently being encountered. The annular area between the sleeves and the conductor is filled with a heavy grease to aid in providing a seal. Such seals are not entirely effective, however, and small leaks are frequent. Trouble due to such small leaks is avoided by momentarily using a high amperage that vaporizes the leaking fluid and reduces the electrical loss to a minimum. This practice of the logging industry is not practical in various applications as in downhole pressure measuring devices. An increase in amperage would tend to damage the downhole instrument, as indeed frequently occurs when this practice is employed with logging tools. In addition, an even minute leakage would buildup to prohibitive levels during relatively long tests as are more frequently required by present well testing technology.

In another solution to this problem, the electrical connection between a downhole pressure measuring instrument and the conductor extending to the surface is positioned in an annular area around the connection. This area is filled with a suitable adhesive insulating material. While this procedure is adequate for some relatively low pressure applications, a short in the electronic circuit results when this type of device is employed in a high pressure application. At the high pressures, solid insulator materials tend to fragment, while fluid insulators tend to dissolve in the wellbore fluids. Devices of this general type had been found to be unreliable when employed in wellbore environments of about 5,000 p.s.i.g. pressure and 200° F. temperature.

It is an object of the present invention, therefore, to provide a device for isolating an electrical connection from the environment in a wellbore.

It is another object of the present invention to provide a device for sealing from the wellbore environment the electrical connection between a downhole wellbore instrument and the connecting cable extending to the surface.

It is another object of the present invention to provide a means for isolating an electrical connection from the fluids in a wellbore that will be reliable under relatively severe wellbore conditions.

It is a further object of the present invention to provide an apparatus for sealing an electrical connection between a downhole wellbore instrument and a cable extending to the surface that will be adequate for use in deep wells.

It is a further object of the present invention to provide a sealing apparatus for isolating an electrical connection from the wellbore environment that will be reliable at pressures above 5,000 p.s.i.g. and temperatures above 200° F.

With these and other objects in mind, the following is a summary and detailed description of the present invention, the novel features of which are set forth in the appended claims.

SUMMARY OF THE INVENTION

The present invention comprises a device for isolating the electrical connection between a downhole wellbore instrument and a single strand conductor extending to electronic recording devices located at the surface. In accordance with the present invention, a pressure-deformable sealing ring is positioned around the conductor at a convenient point above the connection between the conductor and the downhole instrument. Mechanical means are provided for applying pressure to the sealing ring so as to deform the ring into sealing contact with the conductor. The sealing ring is seated in a packing gland having an opening extending therein through which the conductor is passed. Mechanical means are provided for applying pressure to the sealing ring so as to deform the ring into sealing contact with the conductor within the confines of the packing gland in which the sealing ring is seated.

The packing gland is removably secured to a supporting block that is affixed to a cable head connector having an opening in the upper portion thereof in which the connection between the downhole instrument and the conductor that extends to the surface is positioned. The packing gland containing the sealing ring positioned about the conductor and the electrical connection between the conductor and the downhole instrument are both positioned, therefore, in a space enclosed by the cable head connector and the supporting block. An outer enclosing block is removably secured to the cable head connector. This outer enclosing block has an opening extending therethrough to accommodate the conductor and a wider opening in the lower most portion thereof to accommodate the supporting block and the packing gland therein.

To further prevent in ingress of well fluids into the space defined by the cable head connector and the supporting block, sealing means are provided between the cable head connector and the outer enclosing block and between the outer enclosing block and the supporting block. Because of the presence of sealing means at these points, well fluids are prevented from reaching the interface between the cable head connector and the supporting block.

While sealing ring positioned in the packing gland serves to prevent the leakage of small quantities of well fluids along the periphery of the conductor to the area in the vicinity of the electrical connection, it is also desirable to prevent the body of well fluids in the wellbore from contacting the portion of the packing gland that is affixed to the supporting block. This is accomplished by positioning a pressure plate above and in pressure contact with the supporting block. In order to provide a positive mechanical link between the downhole apparatus and the conductor, the outer armor wires of the conductor may be reversed through a guide plate above the pressure plate. This guide plate is positioned so that the securing of the outer enclosing block to the cable head connector causes the annular end portion of the opening in the outer block to maintain a cover plate in pressure contact with the guide plate. The packing gland, the supporting block, the pressure, guide and cover plates are all positioned, therefore, within the axial opening in the lower most portion of the outer enclosing block.

BRIEF DESCRIPTION OF THE DRAWING

The invention is hereinafter described in further detail with reference to the accompanying drawings in which:

FIG. 1 is a side elevational view, in cross section, of an embodiment of the present invention;

FIG. 2 is a side elevational view, in cross section, of a portion of the apparatus shown in FIG. 1.

DETAILED DESCRIPTION OF THE INVENTION

Figure 3:
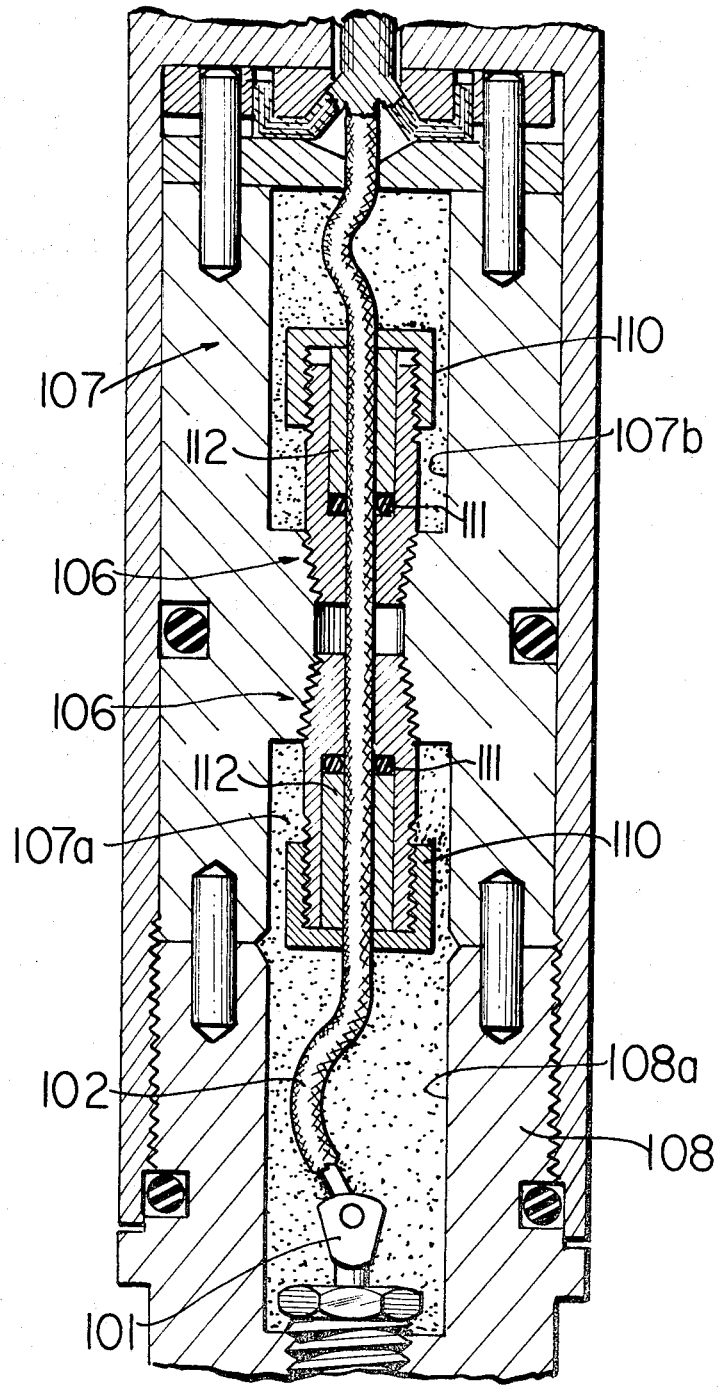
FIG. 3 is a side elevational view, in cross section, of an alternate embodiment in which two sealing mechanisms in contact with the conductor are supported on a common supporting block.

As indicated above, the present invention provides for a pressure-deformable sealing ring positioned around a single strand conductor above the electrical connection between that conductor and a downhole wellbore instrument. Mechanical means are provided for applying pressure to the sealing ring so as to deform the ring into sealing contact with the conductor. A more detailed description is herein made with reference to the accompanying drawings illustrating various embodiments of the present invention, which has been successfully employed to provide a wellbore seal capable of withstanding high pressure, high temperature wellbore environments.

Referring to FIGS. 1 and 2, the numeral 1 represents the electrical connection between woven armored single line wire conductor 2 and instrument conductor 3 that is attached to the pin connector 4 of downhole instrument 5.

Conductor 2 extends upwardly to signal receiving instruments, not shown, that are located at the surface. Positioned about conductor 2 at a point above electrical connection 1 is packing gland 6 having an opening through which conductor 2 is passed. Packing gland 6 is threadedly received by supporting block 7, which has an enlarged axial opening generally represented by the numeral 7a in which packing gland 6 is positioned. Supporting block 7, in turn, is connected to cable head connector 8 and secured against lateral movement by aligning pins 9.

As shown in FIG. 1, cable head connector 8 is threaded to downhole instrument 5. THe numeral 8a represents an axial opening in the upper portion of cable head connector 8. The electrical connection 1 between conductor 2 and instrument conductor 3 is located in this opening 8a. Thus, supporting block 7 and cable head connector 8 enclose a confined space within which electrical connection 1 and packing gland 6 are enclosed.

Returning to consideration of packing gland 6, it can be seen that the upper threaded portion is removably secured to supporting block 7, while the lower end is threaded to receive locking nut 10. Packing gland 6 has an axial opening extending therethrough for passage of conductor 2 and an enlarged axial opening, designated by the numeral 6a, in the lower portion thereof. Seated at the uppermost end of opening 6a in packing gland 6 is pressure-deformable sealing ring 11, which is positioned around conductor 2 and fills the annular opening between conductor 2 and packing gland 6 at the uppermost portion of opening 6a. Mechanical means for applying pressure to sealing ring 11 is provided by annular pressure ring 12 which is rigidly secured to locking nut 10. Annular pressure ring 12 is so positioned that it fits into the annular space between conductor 2 and packing gland 6 in the enlarged opening portion 6a thereof. As locking nut 10 is secured to packing gland 6, therefore, annular pressure ring 12 moves into the packing gland, whereas the annular pressure ring moves outwardly when the locking nut 10 is loosened from packing gland 6. When locking nut 10 is fully secured to packing gland 6, annular pressure ring 12 contacts sealing ring 11 with sufficient pressure so as to deform the sealing ring into sealing contact with the conductor. Passage of wellbore fluids down conductor 2 into the confined space within which electrical connection 1 is positioned is thereby avoided.

In as shown in both FIGS. 1 and 2, the sealing mechanism thus described is further enclosed within an outer enclosing block 13 that is threadedly connected to cable head connector 8. This outer enclosing block has an upper axial opening 13a to accommodate conductor 2 and an enlarged axial opening 13b in its lowermost portion. Within enlarged opening 13b are positioned cable head connector 8, supporting block 7, and the pressure, guide and cover plates that will be referred to hereinafter in further detail.

Leakage of well fluids into the confined space within which electrical connection 1 is positioned may occur not only along the surface of conductor 2, which is precluded by the packing gland arrangement referred above, but also by ingress along the interface between cable head connector 8 and the supporting block 7 attached thereto. In order to prevent such ingress of well fluids, sealing means are positioned between supporting block 7 and outer enclosing block 13 and between outer enclosing block 13 and cable head connector 8. The sealing means, which are generally represented by the numeral 14 are conveniently "O" rings, of any of a variety of commercially available plastics and synthetic rubbers capable of withstanding high temperatures, e.g. 250° F., and high pressures, e.g. 10,000 p.s.i.g., without being permanently deformed. As will be appreciated by those skilled in the art, a backup ring may also be employed in conjunction with each "O" ring in order to minimize the deformation of the sealing ring under high pressure conditions. As shown in the drawings, sealing means, such as an "O" ring may also be positioned between the cable head connector and the downhole instrument so as to prevent ingress of fluids into the vicinity of the instrument itself.

Above and in contact with supporting block 7 is pressure plate 15 which, in turn, supports guide plate 16. In order to achieve a positive mechanical link between conductor 2 and the cable head assembly, the outer armor wires, generally represented by the numeral 17, of conductor 2 are reversed into cover plate 16. This arrangement provides a positive mechanical link between the cable and the instrument with a desirable failure point of one-half the cable strength at the downhole instrument. In order for this link arrangement to fail, the shearing of the outer armor would be required. If desired, the outer armor wires may be reversed through a separate guide plate, not shown, that is backed by cover plate 16 under pressure.

Pressure plate 15 and cover plate 16 are held in proper position with respect to supporting block 7 by means of supporting and aligning pins 18. As outer enclosing block 13 is threadedly connected to cable head connector 8 the annular end portion of opening 13b therein contacts cover plate 16 and establishes pressure contact between cover plate 16 and pressure plate 15 and, in turn, between pressure plate 15 and supporting block 7. The wellbore environment is therefore effectively separated from packing gland 6 in supporting block 7 by a combination of outer enclosing block 13, cover plate 16 and pressure plate 15, which is in pressure contact with supporting block 7.

As shown in FIG. 1, outer enclosing block 13 has a recess 19 in the upper portion thereof. This recess serves to facilitate the hooking of the device by a line run down the wellbore from the surface in the event it becomes necessary to employ such secondary means to recover the cable head connection and the instrument from the wellbore.

As a further assurance against failure of the sealing mechanism of the present invention, the confined area around electrical connection 1 may be filled with a suitable fluid insulating material, such as a silicon-based grease, in order to prevent electrical connection 1 from being contacted by any small amount of wellbore fluid that managed to achieve ingress into the space confined by the supporting block and the cable head conductor despite the sealing mechanism hereinabove described.

In another embodiment of the present invention designed to further ensure the reliability of the cable head assembly of the present invention, a common supporting block may be employed in conjunction with two separate packing glands. Such an embodiment is illustrated in FIG. 3 hereof. In the embodiment, the common supporting block is designated by the numeral 107. This supporting block has an axial opening extending therethrough for passage of conductor 102. It also has an enlarged axial opening 107a positioned at its lower end and a second enlarged axial opening 107b positioned at its uppermost end portion. As in the previous embodiment, supporting block 107 is in contact with cable head connector 108 positioned thereunder. The cable head connector has axial opening 108a in the upper portion thereof, in which electrical connection 101 is positioned.

Packing glands 106 are positioned in both the lower and the upper enlarged axial openings in the supporting block, namely in opening 107a and 107b, and each packing gland is threaded to supporting block 107. Each packing gland 106 also has a sealing ring 111 positioned therein around and in contact with conductor 102. An annular pressure ring 112 is adapted to fit into the annular space about conductor 102 in the enlarged opening in packing glands 106. Annular pressure rings 112 are adapted to move into and out of packing glands 106 by means of locking nuts 110 to which the annular pressure rings are secured. As each locking nut 110 is threaded onto packing gland 106, annular pressure ring 112 affixed thereto is moved into the packing gland, establishing pressure contact with sealing ring 111 as the locking nut approaches a fully secured position. In this position, the annular pressure ring applies sufficient pressure to sealing ring 111 so as to deform the ring into a sealing contact with conductor 102. By means of this arrangement, therefore, two sealing rings are deformed into sealing contact with the conductor, thereby providing a further assurance against leakage of well fluids into the confined space enclosed by the supporting block and the cable head conductor. In all other respects, the apparatus of this embodiment is essentially the same as that described with reference to FIGS. 1 and 2.

While the materials of construction are not a critical feature of the present invention, it is generally desired that the parts generally be constructed of stainless steel in order to withstand the corrosive environments frequently encountered in wellbore operations. It has been found convenient to employ packing glands made of "Teflon", a polytetrafluoroethylene marketed by DuPont. It has generally been found desirable to employ insulating materials, as in the "O" rings, having a hardness at least about equal to that of polypropylene. In order for the "O" rings to provide a seal of the desired degree of effectiveness in preventing ingress of wellbore fluids over a period of time, it has generally been found desirable to provide a tolerance of not more than about 0.006 inches between the adjacent surfaces in conjunction with which the "O" ring is to provide a seal.

The cable head assembly of the present invention has been employed in numerous tests, under varying conditions, without malfunction. It has, for example, been tested in the presence of concentrated brines, and at pressures as high as 7,000 p.s.i.g. and temperatures as high as 250° F., and for periods of time extending over several weeks. The reliability of the present invention under adverse circumstances greatly exceeds that of commercially available sealing devices presently available to the art.

The invention has, of course, been disclosed herein with reference to particular embodiments thereof. It will be appreciated by those skilled in the art, however, that various changes and modifications can be made without departing from the scope of the invention.

Therefore, we claim:

1. Downhole wellbore instrument sealing apparatus for isolating the electrical connection between a downhole wellbore instrument and a single strand conductor capable of extending to the surface from the fluids in the wellbore environment comprising:

a. a pressure-deformable sealing ring, capable of withstanding the high pressure and high temperature of wellbore environments, positioned around said conductor above the connection between the conductor and the downhole wellbore instrument;

b. a packing gland having an opening therein through which said conductor is positioned, said sealing ring being seated in said opening in the packing gland;

c. an annular pressure ring adapted to move into and out of said packing gland around said conductor, in its innermost position, said annular pressure ring applying sufficient pressure to the sealing ring to deform said ring into sealing contact with the conductor;

d. a locking nut secured to said annular pressure ring and removably secured to said packing gland, said locking nut being adapted so as to position the annular pressure ring in its innermost position when fully secured to said packing gland.

e. a supporting block, said packing gland being removably secured thereto;

f. a cable head connector removably secured to the downhole wellbore instrument, said connector having an opening in the upper portion thereof, said connection between the downhole wellbore instrument and said conductor extending to the surface being positioned in said opening;

g. a pressure plate rigidly secured to said supporting block, said pressure plate being positioned on the upper side of said supporting block;

h. an outer enclosing block removably connected to said cable head connector and extending upwardly therefrom, said outer enclosing block having an opening therethrough in which said sealing ring, packing gland, supporting block, and conductor extending to the surface are positioned; and i. sealing means between said supporting block and said outer enclosing block and between said outer enclosing block and said cable head connector so as to prevent ingress of well fluids to the space enclosed by the supporting block and the cable head connector.

2. The apparatus of claim 1 and including a fluid in said opening in the upper portion of said cable head connector, said fluid extending above the electrical connection and possessing insulating characteristics sufficient to prevent wellbore gases and liquids from contacting said electrical connection.

3. The apparatus of claim 1 and including a cover plate in pressure contact with said pressure plate, the outer covering of the conductor being reversed against said cover plate to provide a positive mechanical link between the conductor and the sealing apparatus.

4. The apparatus of claim 1 in which said sealing means comprises sealing rings positioned between and in contact with said supporting block and outer enclosing block and between and in contact with said outer enclosing block and said cable head connector.

5. The apparatus of claim 4 and including mechanical means in the upper portion of said outer enclosing block for facilitating removal of said apparatus from the wellbore.

6. The apparatus of claim 5 in which said mechanical means for facilitating removal of the apparatus from the wellbore comprises a recess on the outer surface of said outer enclosing block, said recess being adapted to secure a removal line lowered from the surface to the apparatus in the wellbore.

7. The apparatus of claim 1 and including a pressure plate in pressure contact with the upper surface of said supporting block.

8. The apparatus of claim 7 and including a cover plate in pressure contact with said pressure plate, the outer covering of the conductor being reversed against said cover plate to provide a positive mechanical link between the conductor and the sealing apparatus.

9. The apparatus of claim 8 in which the enclosing block, when secured to said cable head connector, is in pressure contact with said cover plate.